(No Model.) 2 Sheets—Sheet 1.

A. T. SIMPKINS.
BAKER'S OVEN.

No. 355,568. Patented Jan. 4, 1887.

WITNESSES
S. L. Schrader.
Edwin Sauter.

INVENTOR
Alvin T. Simpkins
by
Paul Bakewell
his Att'y.

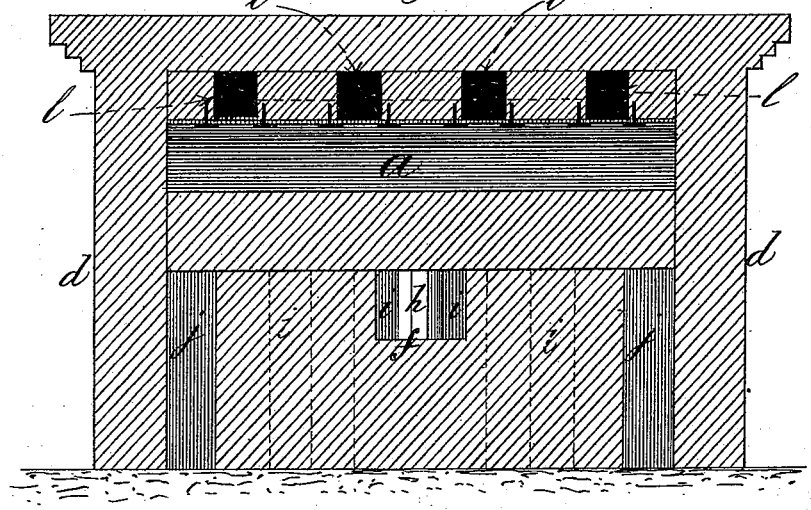
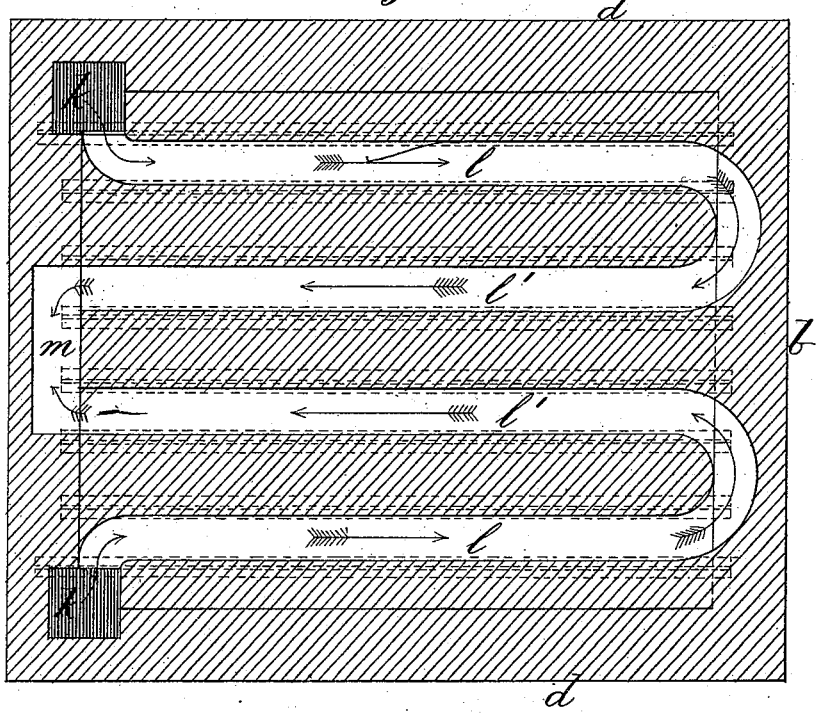

UNITED STATES PATENT OFFICE.

ALVIN T. SIMPKINS, OF ST. LOUIS, MISSOURI.

BAKER'S OVEN.

SPECIFICATION forming part of Letters Patent No. 355,568, dated January 4, 1887.

Application filed July 20, 1886. Serial No. 208,528. (No model.)

*To all whom it may concern:*

Be it known that I, ALVIN T. SIMPKINS, a citizen of the United States, residing at the city of St. Louis, State of Missouri, have invented a certain new and useful Improvement in Bakers' Ovens, of which the following is a full, clear, and exact description.

My invention relates to improvements in the construction and arrangement of bakers' ovens, and has for its object to prevent the overheating of the rear end of an oven and consequent burning of the bread placed thereat before the bread placed at the front part of the oven is sufficiently baked, which is more or less the case with the bakers' ovens in present use.

Figure 1:
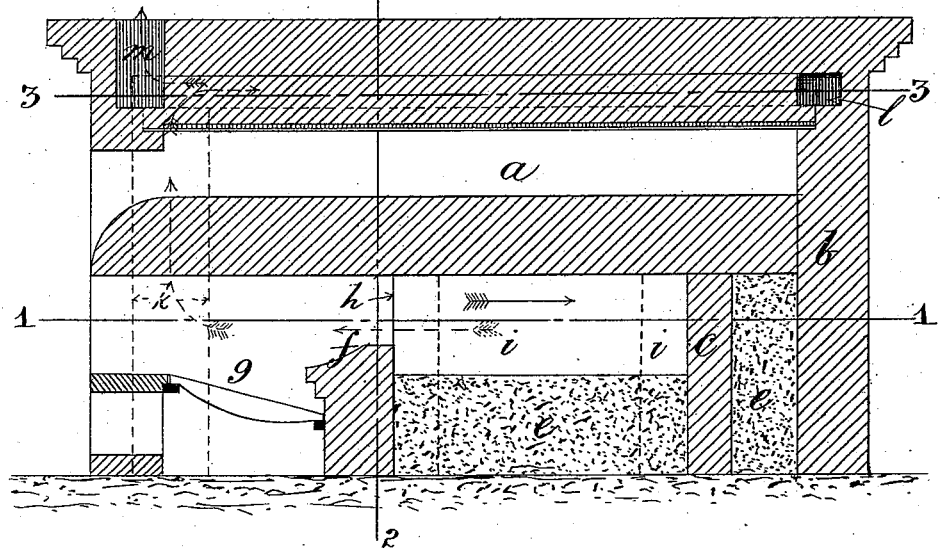
Figure 2:
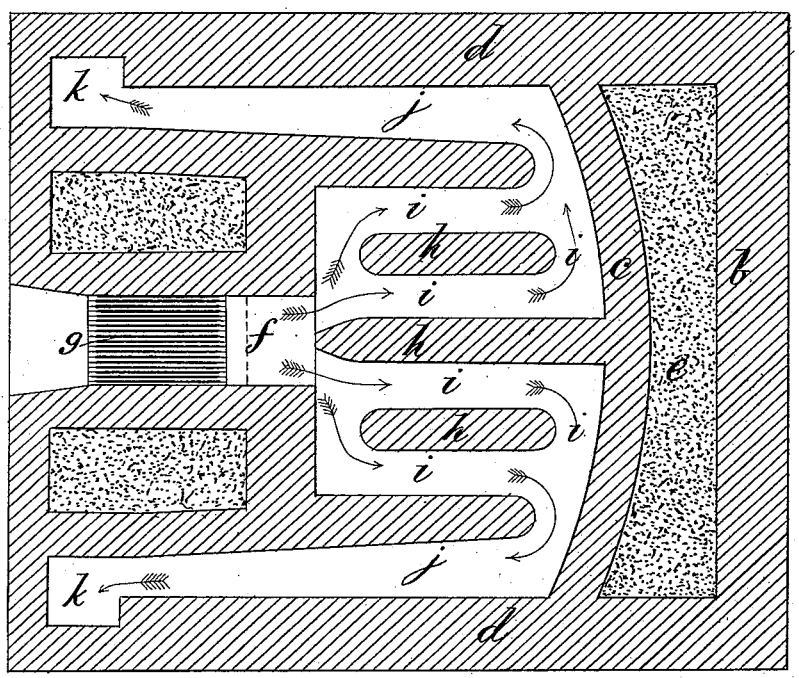

In the accompanying drawings, Figure 1 is a side sectional view of my improved baker's oven; Fig. 2, a sectional plan on line 1 1 in Fig. 1; Fig. 3, a transverse section on line 2 2 in Fig. 1, and Fig. 4 a sectional plan on line 3 3 in Fig. 1, like letters of reference denoting like parts in all the figures.

In carrying out my invention I dispense with or stop off the vertical flue usually provided behind the rear end of the oven, and prolong the oven-chamber $a$ back to the rear wall, $b$, of the brick setting. Beneath the oven $a$, at a suitable distance forward from the rear wall, $b$, is an upright wall, $c$, which sets against the under side of the oven $a$ and extends transversely for the entire width of the latter between the side walls, $d$, thereby stopping off the passage of any direct heat behind the rear end of the oven $a$, the space between the walls $c$ and $b$ being filled with dirt, rubbish, or other suitable material, $e$. Between the wall $c$ and the bridge $f$ of the fire-place $g$ are arranged upright walls $h$, bedding at top against the under side of the oven $a$ and forming horizontal flues $i$ thereto, through which the heated gases and products of combustion from the fire-place $g$ circulate, as noted by the arrows on each side of the center wall, $h$, against the bottom of the oven $a$, and along the side flues, $j$, to the front vertical flues, $k$, through which they pass into and along the horizontal flues $l$, arranged above the crown of the oven $a$, and thence return through similar flues, $l'$, to the exit-flue $m$, in front of the oven. By this means the heat is uniformly distributed over the bottom and top of the oven $a$ without the action of any direct heat at and behind the rear end of the latter, as at present the case, so that a more uniform temperature is imparted to the interior of the oven, and the loaves of bread placed therein are properly and equally baked without the necessity and trouble of shifting the loaves.

I claim—

1. In bakers' ovens, the upright wall $c$, in combination with oven $a$ and side walls, $d$, of brick setting, substantially as shown, and for the purpose described.

2. In bakers' ovens, the upright wall $c$, horizontal flues $i j$, vertical flues $k$, and horizontal flues $l l'$, in combination with oven $a$, substantially as shown, and for the purpose described.

In testimony whereof I affix my signature in presence of two witnesses this 17th day of July, 1886.

ALVIN T. SIMPKINS.

Witnesses:
S. L. SCHRADER,
PAUL BAKEWELL.